(12) United States Patent
Wang

(10) Patent No.: US 6,858,343 B2
(45) Date of Patent: Feb. 22, 2005

(54) TERMINAL HAVING NUT-POSITIONING DEVICE

(75) Inventor: Pai-Hua Wang, Tainan Hsien (TW)

(73) Assignee: CSB Battery Co., Ltd., Tainan Hsien (TW)

( * ) Notice: Subject to any disclaimer, the term of this patent is extended or adjusted under 35 U.S.C. 154(b) by 120 days.

(21) Appl. No.: 10/322,583

(22) Filed: Dec. 19, 2002

(65) Prior Publication Data

US 2003/0186121 A1 Oct. 2, 2003

(30) Foreign Application Priority Data

Mar. 27, 2002 (TW) ........................................ 91203815 U

(51) Int. Cl.⁷ ............................................. H01M 2/30
(52) U.S. Cl. ....................................... 429/121; 429/178
(58) Field of Search ................................. 429/121, 178

(56) References Cited

U.S. PATENT DOCUMENTS

| | | | | |
|---|---|---|---|---|
| 4,740,179 A | * | 4/1988 | Padget | 439/765 |
| 5,445,907 A | * | 8/1995 | Ito et al. | 429/178 |
| 5,796,588 A | * | 8/1998 | Machida et al. | 361/773 |
| 6,001,506 A | * | 12/1999 | Timmons et al. | 429/178 |
| 6,250,973 B1 | * | 6/2001 | Lowery et al. | 439/763 |

FOREIGN PATENT DOCUMENTS

| | | | | |
|---|---|---|---|---|
| EP | 1355368 | * | 10/2003 | H01M/2/30 |
| JP | 08-124616 | * | 5/1996 | H01R/11/12 |
| JP | 11-238502 | * | 8/1999 | H01M/2/30 |
| JP | 2000-100418 | * | 4/2000 | H01M/2/30 |

* cited by examiner

Primary Examiner—Mark Ruthkosky
(74) Attorney, Agent, or Firm—Bacon & Thomas PLLC

(57) ABSTRACT

A terminal having a nut-positioning device. The terminal including a horizontal potion, a vertical portion and a nut-positioning device. The horizontal and vertical potions respectively have a round hole enabling the fastening device to pierce therethrough and the round hole of the horizontal portion is configured to lockingly joint the output end of a lead-acid battery via the fastening device, and the round hole of the vertical portion is configured to lockingly joint an external electrical component via another fastening device. The nut-positioning device has a pair of vertically paralleled supporting arms to vertically extend from both ends of the vertical portion, and a pair of correspondingly biased arms extend from the extreme end of the supporting arms, and another pair of correspondingly biased arms is extended from the lower side end of such supporting arms.

7 Claims, 4 Drawing Sheets

TERMINAL HAVING NUT-POSITIONING DEVICE

BACKGROUND OF THE INVENTION

1. Field of the Invention

The invention relates to a nut-positioning device, more particularly, a nut-positioning device used for connecting a guide wire terminal; the nut-positioning device comprises a pair of supporting arms, from both the extreme ends and the lower side ends of which two pairs of correspondingly biased arms are formed; a containing space is formed by the supporting arms and the two pairs of biased arms, thus enabling the nut to be placed therein, for the purpose of fastening the nut and prevent the nut from loosening and eventually falling off in cramped space or under high voltage operations.

2. Description of the Related Art

In electrical operation systems generally, various electrical components require terminals to achieve electrical connection, and the structure of the conventional terminal 40, as shown in FIG. 1, comprises a horizontal portion 11 and a vertical portion 12, wherein the round hole 110 installed in the horizontal portion 11 is provided for a fastening device including screw and nut to lockingly joint, thus achieving electrical connection with, e.g., the output end of the lead-acid battery, and the round hole 120 installed in the vertical portion 12 is provided for another fastening device to lockingly joint, thus achieving the electrical connection to electrical components.

When the output end of the lead-acid battery and electrical components are in need of being connected, the round hole 110 of the horizontal portion 11 can be lockingly jointed with the output end of the lead-acid battery through the fastening device, and then the round hole 120 of the vertical portion 12 is to be connected with certain electrical component through the fastening device, thus the output end of the lead-acid battery and the electrical component can be conductively connected; when fastening the electrical component in the round hole 120 of the vertical portion 12, the user needs to use one hand to place the nut on one side of the vertical portion 12, with the other hand holding the screw and piercing the screw through the round hole 120 of the vertical portion 12 from the other side to joint both the screw and the nut; yet since various electrical components are installed in such system having a cramped space, thus causing the nut to be easily loosened and fall off and difficult to put the nut back on.

In addition, though threads can be added on the inside surface of the round hole 120 of the vertical portion 12, so that the locking effect of the fastening device can be further enhanced; however, the fastening device has to go through repeated inspections, thus causing threads of the round hole 120 to sustain long-term wear and tear; eventually the screw shall be unable to lock onto the round hole 120, and as a result, the whole terminal has to be replaced, thus causing inconvenience and time-consuming to the user; further, the installment of threads also increases the production cost and prolong the production process.

SUMMARY OF THE INVENTION

The primary object of the invention is to provide a nut-positioning device used for connecting a guide wire terminal, which includes a containing space that, formed by the supporting arms thereof and two pairs of correspondingly biased arms extended from both the extreme ends and the lower side ends of the supporting arms, enables the screw to be placed therein, and the nut is not to be loosened or fall off either forwardly or downwardly, thus the connecting wire of the electrical component is to be easily locked and fastened.

The terminal having nut-positioning device that is capable of achieving the aforementioned object comprises a terminal, having the vertical portion and the horizontal portion that can be pierced through by the fastening device; a nut-positioning device, having a pair of supporting arms and two pairs of biased arms correspondingly extended from both the extreme ends and the lower side ends of the supporting arms, and a containing space is formed by the supporting arms and the two pairs of biased arms, wherein the nut for fastening a fastening device can be placed, thus the nut of the fastening device can be fastened in such containing space without loosening.

The foregoing horizontal portion includes a round hole for connecting and fastening, e.g., the output end of the lead-acid battery.

The foregoing vertical portion also includes a round hole through which the screw of the fastening device can pierce.

BRIEF DESCRIPTION OF THE DRAWINGS

These and other features, aspects and advantages of the present invention will become better understood with regard to the following description, appended claims and accompanying drawings that are provided only for further elaboration without limiting or restricting the present invention, where:

DETAILED DESCRIPTION OF THE PREFERRED EMBODIMENT

Figure 1:
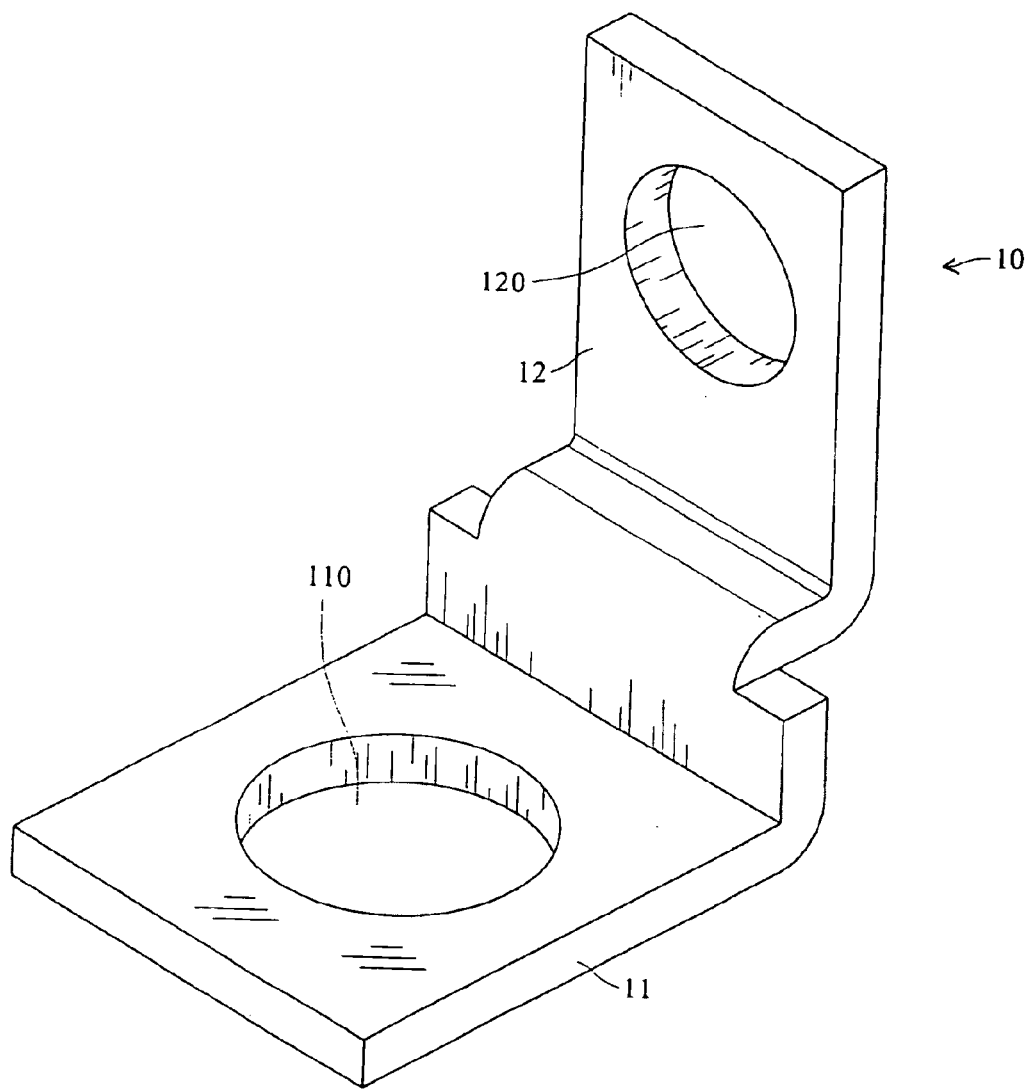
FIG. 1 shows a perspective view of the structure of a conventional terminal.
Figure 2:
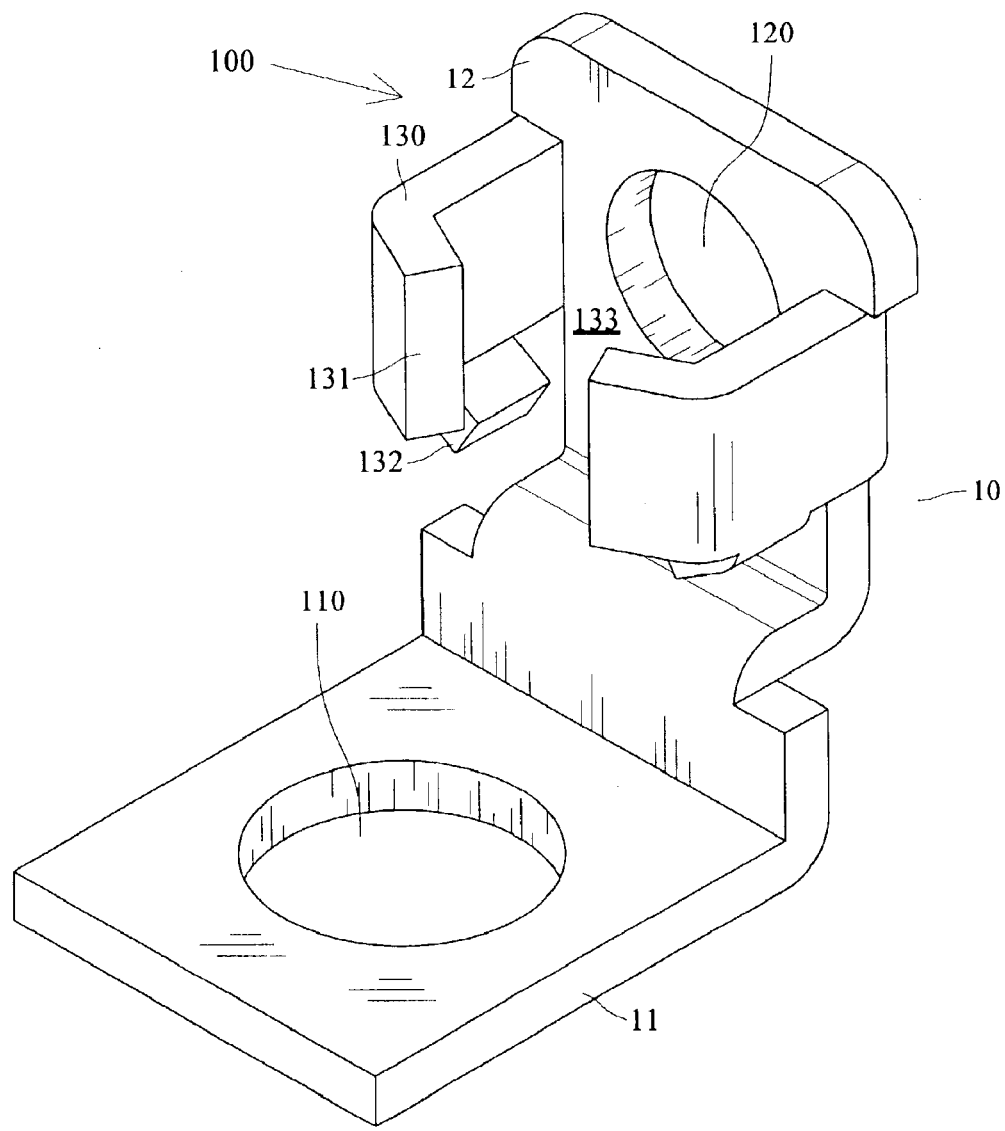
FIG. 2 shows a structural perspective view of the terminal having nut-positioning device of the invention.

Please refer to FIG. 2, which shows a structural perspective view of the terminal 10 having nut-positioning device 100 of the invention; the terminal 10 comprises: a horizontal portion 11, a vertical portion 12 and a nut-positioning device 100, wherein the horizontal portion 11 is installed with a round hole 110, which is used for locking and jointing purposes so as to electrically connect, e.g., the output end of lead-acid battery; the vertical portion 12 is also installed with a round hole 120 for being pierced by the screw of the fastening device containing the screw and the nut, and for locking and jointing purposes so as to electrically connect external electrical components; the nut-positioning device 100 comprises a pair of supporting arms 130 perpendicularly extended from one side end of the vertical portion 12, and a pair of correspondingly biased arms 131 extends from the extreme end of such supporting arms 130, and the other pair of correspondingly biased arms 132 is extended from the lower side end of such supporting arms 130, thus a containing space 133 is formed by the supporting arms 130 and two pairs of biased arms 131 and 132 extended therefrom; the nut 22 of the fastening device 20 can be placed in the containing space 133 (please refer to FIG. 3 and FIG. 4); with the nut 22 being held by the supporting arms 130 and the two pairs of biased arms 131 and 132 without loosening, enabling the screw 21 of the fastening device 20 can be lockingly jointed and thus fastened with the nut 22.

Figure 3:
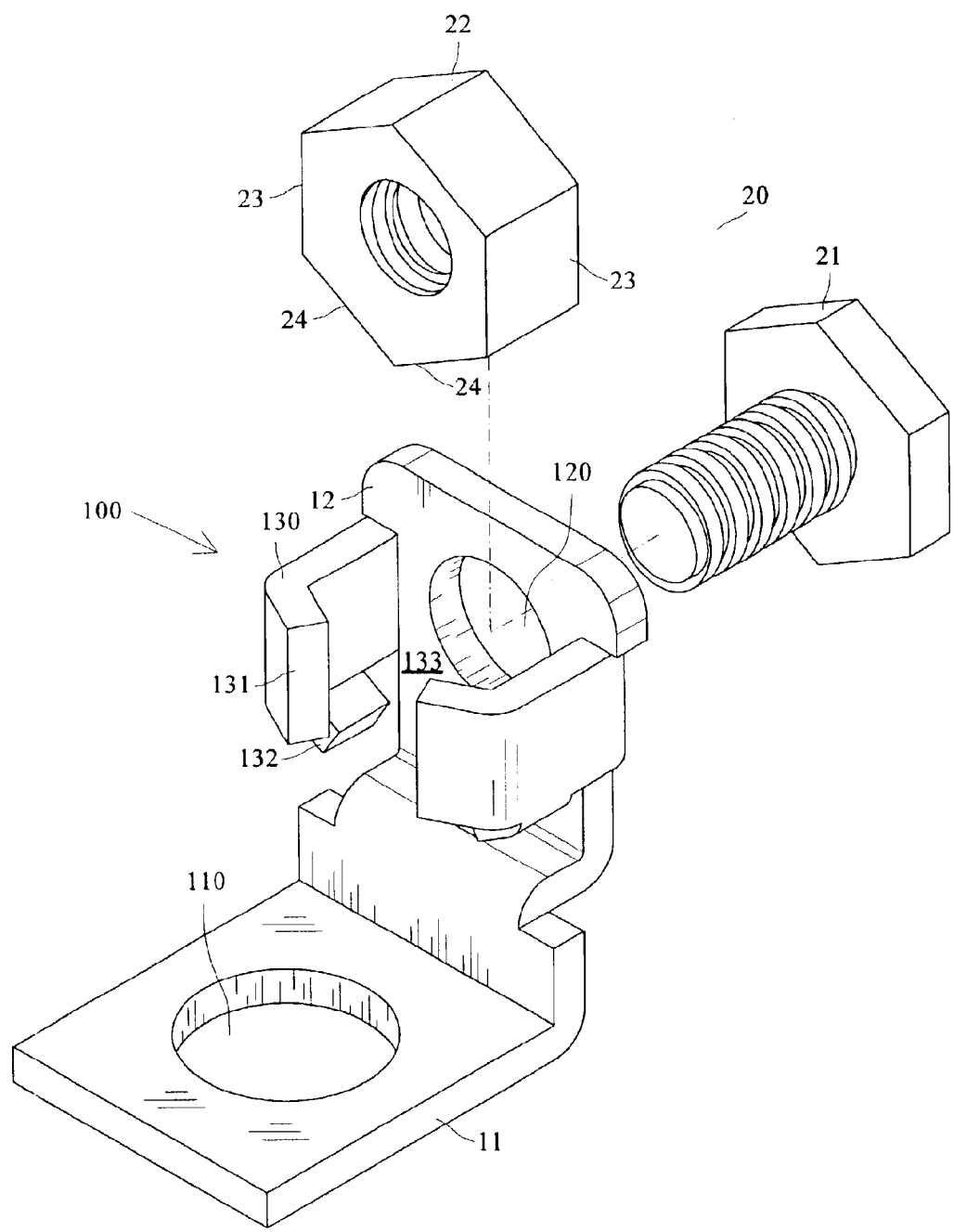
FIG. 3 shows a dissecting perspective view of the terminal having nut-positioning device and the fastening device of the invention.

Please refer to FIG. 3, which shows a dissecting perspective view of the terminal 10 having nut-positioning device 100 and the fastening device 20 of the invention, wherein the fastening device 20 comprises the screw 21 and the nut 22, with the screw 21 having the screw head and the screw body having threads thereon; the nut 22 is installed with the screw hole, wherein threads are also installed to correspond with threads on the screw body. When the connecting wire of an electrical component (not shown in drawings) is to be connected to the terminal 10, the nut 22, first to be placed in the containing space 133 formed by the nut-positioning device 100, is held by the supporting arms 130, a pair of correspondingly biased arms 131 extends from the extreme end of such supporting arms 130, and the other pair of correspondingly biased arms 132 is extended from the lower side end of such supporting arms 130, thus causing the nut 22 not to be loosening or falling off either forwardly or downwardly. At this time the screw hole of the nut 22 is exactly facing the round hole 120 of the vertical portion 12, and the screw 21 connects to the connecting wire of an electrical component (not shown in drawings), and then the screw 21 is to pierce through the round hole 120 from the other side of the vertical portion 12 and lock and joint with the nut 22, as shown in FIG. 4.

Figure 4:
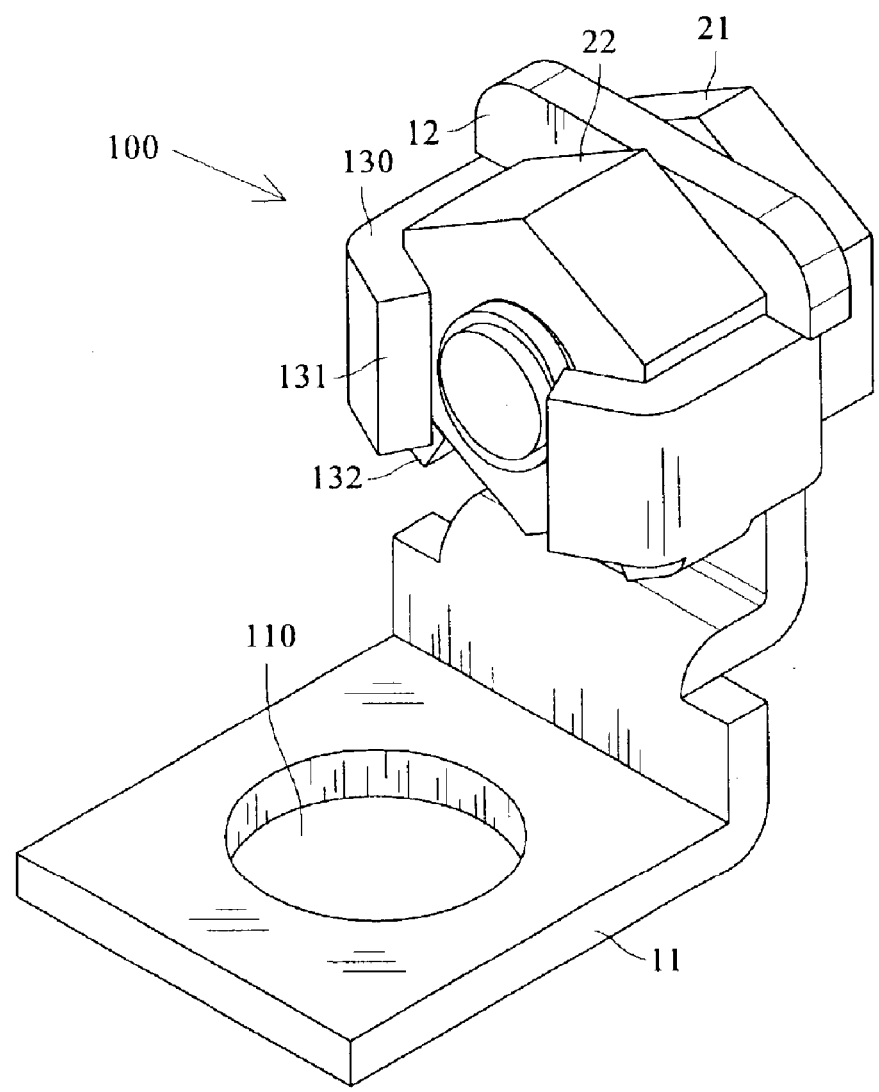
FIG. 4 shows an integrated perspective view of the terminal having nut-positioning device and the fastening device of the invention.

In FIG. 4, since the external structure of the nut 22 is of hexagonal shape, it can be in tune with the screw 21 for the screw's lockingly connecting the connecting wire of an electrical component in the containing space 133 of the nut-positioning device 100; the two vertically paralleled sides 23 of the nut 22 are to prop against the inner side of the supporting arms 130 (please refer to FIG. 3), thus, with the biased arms 131 of the supporting arms 130, the nut 22 is to be prevented from moving sideways and falling down; two adjacent biased sides 24 underneath the nut 22 are to biasly prop against the correspondingly biased arms 132 extended downwardly from the horizontal ends 130, thus the nut 22 is to be prevented from moving and falling downwardly. As a result, it is quite convenient to joint the nut 22 and the screw 21. In addition, when inspecting or maintaining electrical components, the fastening device 20 has to be dissembled; at this time, the user can just rotate the screw 21, then the nut 22 is to be detached therefrom without rotating, for the nut 22 is totally held by two pairs of biased arms 131 and 132 of the supporting arms 130 of the nut-positioning device 100; thus the screw 21 and the nut 22 of the fastening device 20 can also be easily jointed or dissembled.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

What is claimed is:

1. A terminal having a nut-positioning device, comprising:
   a horizontal portion and a vertical portion, wherein one end of said horizontal portion is jointed to one end of said vertical portion, with one side of said vertical portion installed with a nut-positioning device used for containing the nut;
   wherein said nut-positioning device comprises a pair of paralleled and symmetrical supporting arms extended from one end of said vertical portion, with the extreme end of said supporting arms being extended to form a pair of correspondingly biased arms, and with the side ends of said supporting arms being extended to form the other pair of correspondingly biased arms; and
   a containing space, formed by said supporting arms and two pairs of said biased arms, is used for holding said nut of the nut-positioning device to keep said nut from loosening.

2. A terminal having a nut-positioning device, comprising:
   a horizontal portion and a vertical portion, wherein one end of said horizontal portion is jointed to one end of said vertical portion, with one side of said vertical portion installed with a nut-positioning device used for containing the nut;
   wherein said nut-positioning device comprises a pair of unsymmetrical supporting arms extended from one end of said vertical portion, with the extreme end of said supporting arms being extended to form a pair of correspondingly biased arms, and with the side ends of said supporting arms being extended to form the other pair of correspondingly biased arms; and
   a containing space, formed by said supporting arms and two pairs of said biased arms, is used for holding said nut of said nut-positioning device to keep said nut from loosening.

3. A terminal having a nut-positioning device, comprising:
   a horizontal portion and a vertical portion, wherein one end of said horizontal portion is jointed to one end of said vertical portion, with one side of said vertical portion installed with a nut-positioning device used for containing the nut;
   wherein said nut-positioning device comprises at least a supporting arm perpendicularly extended from one end of said vertical portion, and a plurality of pairs of correspondingly biased arms are extended from the extreme end of said supporting arm; and
   a containing space, formed by said supporting arm and a plurality of pairs of said biased arms extended from the side end of said supporting arm, is used for holding said nut of the nut-positioning device to keep said nut from loosening.

4. The terminal having nut-positioning device as in claim 3, wherein said nut-positioning device comprises three supporting arms perpendicularly extended from one end of said vertical portion, and a plurality of pairs of correspondingly biased arms are extended from the extreme ends of said three supporting arms; a containing space, formed by said three supporting arms and a plurality of pairs of said biased arms extended from the side ends of said supporting arms, is used for holding said nut of the nut-positioning device to keep said nut from loosening.

5. The terminal having nut-positioning device as in claim 1, wherein the plane formed by the pair of parallel and symmetrical supporting arms is to be perpendicular to that formed by said vertical portion; the position of said supporting arms can be anywhere on said plane formed by said vertical portion.

6. The terminal having nut-positioning device as in claim 1, wherein the other pair of correspondingly biased arms is extended from the side end of said supporting arms, with the biasing angle being determined by the shape of the nut that is to be held.

7. The terminal having nut-positioning device as in claim 6, wherein the optimal biasing angle is 120 degrees for the nut with hexagonal shape.

* * * * *